United States Patent [19]

Blanc

[11] Patent Number: 4,977,703
[45] Date of Patent: Dec. 18, 1990

[54] PLANT SOIL PROTECTOR

[76] Inventor: Chris Blanc, 6569 Chantry St., Orlando, Fla. 32811

[21] Appl. No.: 472,071

[22] Filed: Jan. 30, 1990

[51] Int. Cl.⁵ .............................................. A01G 9/02
[52] U.S. Cl. .......................................... 47/84; 47/32; 47/25
[58] Field of Search ..................... 47/84, 31, 23, 41.13, 47/32, 25

[56] References Cited

U.S. PATENT DOCUMENTS

| 602,941 | 4/1898 | Harvey | 47/31 |
| 1,989,952 | 2/1935 | Thomas | 47/41.13 |
| 4,712,329 | 12/1987 | Anderson et al. | 47/84 |

*Primary Examiner*—David A. Scherbel
*Assistant Examiner*—Michele A. Van Patten
*Attorney, Agent, or Firm*—H. Jay Spiegel; Christopher W. Brody

[57] ABSTRACT

The present invention relates to an improved plant soil protector. The improved plant soil protector includes a plurality of segments made from a grid-like material which permit the passage of air, water and fertilizer therethrough while protecting the soil from pets or the like. Additionally, each of the segments includes means which permit the segments, when joined together, to adapt to different sized plants as well as different sized pots.

9 Claims, 3 Drawing Sheets

PLANT SOIL PROTECTOR

BACKGROUND OF THE INVENTION

The present invention relates to an improved plant soil protector. In the prior art, various plant soil protectors are known that are designed to prevent soil spillage, deter pets from using the potting soil as an alternate litter box and permit watering and fertilizing while the soil protector is in place. U.S. Pat. No. 4,395,845 to Markowitz and U.S. Pat. No. 4,403,443 to Valente are examples of these types of plant soil protectors. However, Applicant is unaware of any prior art that teaches or fairly suggests a plant soil protector including features which permit adjustment of the soil protector such that different sized pots and plants may be accommodated by a single plant soil protector.

SUMMARY OF THE INVENTION

The present invention relates to an improved plant soil protector. The present invention includes the following interrelated aspects and features:

(A) In a first aspect, the present invention includes a plurality of segments that are designed to cover the soil of a potted plant when joined together.

(B) Each of the segments are made out of a grid-like material which permits the flow of water, air and fertilizer to the soil while preventing a pet from using the soil as an alternative litter box.

(C) Each of the segments includes a clip or other similar structure to permit attachment of each segment to the rim of the pot.

(D) Each of the segments also includes a means to permit the segments when joined together to be used in different sized pots as well as for different sized plants. Each segment may include an extender which may slideably engage a slot in the segment, the slot being either at an end portion or a side portion of the segment. An extender engaging a side slot in a segment may permit the segment to adapt to different sized pots. An extender engaging an end slot in a segment may permit the segment to adapt to different sized plants. The extender is made from the same grid material as the segment so as to permit the flow of water, fertilizer and air therethrough.

(E) Each of the segments may be made in any geometric shape. For a circular pot, six (6) segments may be joined together to cover the soil area. For a square pot, each of the segments may be trapezoidal in shape such that when the segments are joined together the soil area is covered.

Accordingly, it is a first object of the present invention to provide an improved plant soil protector.

It is a further object of the present invention to provide a plant soil protector that prevents pets from using the plant soil as a litter box as well as allowing the flow of air, water and fertilizer therethrough.

It is a yet further object of the present invention to provide an improved plant soil protector that is adaptable for different sized pots as well as plants.

These and other objects, aspects and features of the present invention will be better understood from the following specific description of the preferred embodiments when read in conjunction with the appended drawing figures.

SPECIFIC DESCRIPTION OF THE PREFERRED EMBODIMENTS

Figure 1:
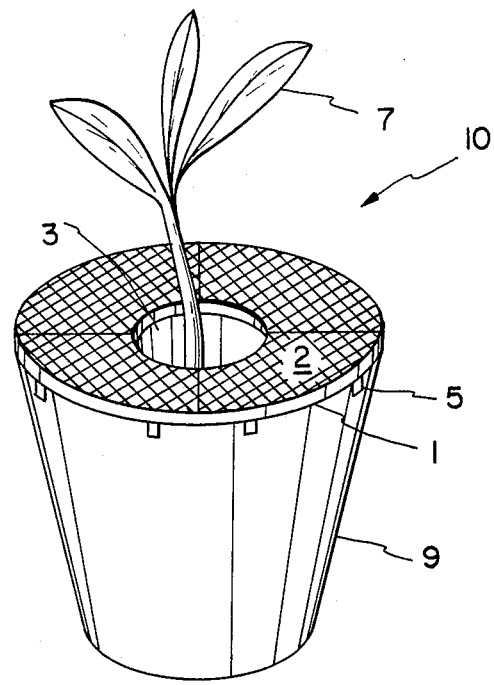
FIG. 1 shows a perspective view of an exemplary embodiment of the improved plant soil protector in use.

With reference to FIG. 1 firstly, the improved plant soil protector is generally designated by the reference numeral 10 and is seen to include a plurality of segments 1 joined together to form the inventive plant soil protector. The segments 1 include a grid material 2 which facilitates the passage of air, water and fertilizer through the soil protector and a clip 5 which permits attaching the segment 1 onto the rim of the pot 9. The segments 1 when joined together form an opening 3 wherein a potted plant 7 may be situated.

Figure 2:
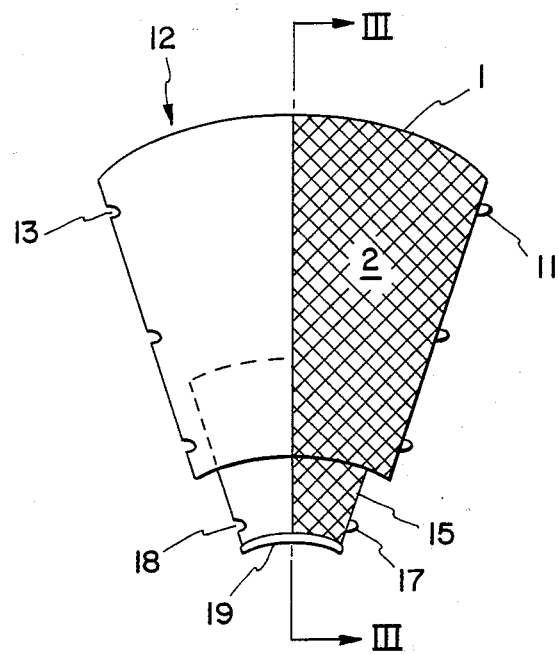
FIG. 2 shows a top view of a segment of the improved plant soil protector shown in FIG. 1.

FIG. 2 shows a top view of a single segment further illustrating the adjustable feature that permits the improved plant soil protector to accommodate different sized plants. As can be seen from the drawing, the segment 1 includes a plurality of protrusions 11 on a first edge with a plurality of recesses 13 located on the opposite edge. The protrusions 11 are adapted to connect to the recesses 13 of an adjacent segment (not shown) to permit joining the segments together. FIG. 2 shows a cut-away portion 12 of the segment 1 to further illustrate the extender 15 slideably engaging the slot opening 18 in the segment 1. The extender 15 also includes a protrusion 17 and a recess 16 which are adapted to engage adjacent extenders when in use.

Figure 3:
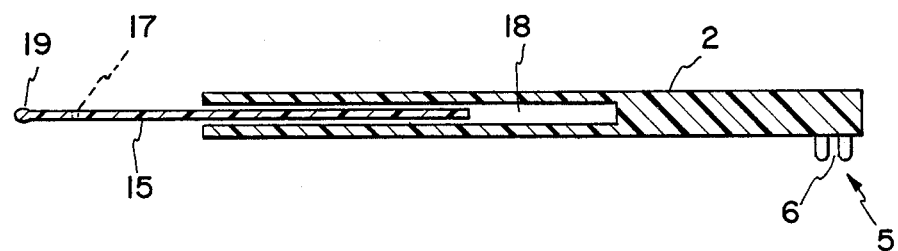
FIG. 3 shows a cross-sectional view along the line III—III of FIG. 2.

FIG. 3 shows a cross-sectional view along the line III—III of FIG. 2 and more clearly illustrates the extender 15 engaging the slotted opening 18 in the segment 1. The extender 15 has a lip 19 thereon to permit withdrawal of the extender 15 from the slotted opening 18 when required. FIG. 3 also illustrates the clip 5 having an opening 6 therein to permit attaching the segment 1 onto the rim of a pot. Of course, other means may be employed to facilitate attaching the segments to a pot such as a clamp assembly.

In operation, the extender 15 may be slid out of the slotted opening 18 when an additional soil area is desired to be covered. The need for covering additional soil area may be the result of a small plant being situated in the potted soil. In the alternative, the extender 15 may be slid completely into the slotted opening 18 to permit a larger area of soil to be uncovered such that a larger plant may be accommodated by the improved plant soil protector. It should be noted that both the segment 1 and the extender 15 are made of a grid material to permit the passage of air, water and fertilizer therethrough while preventing access to the soil by a pet.

Figure 4:
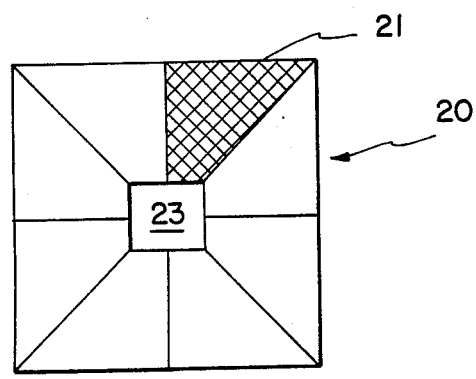
FIG. 4 shows a top view of another exemplary embodiment of the improved plant soil protector.

FIG. 4 shows another exemplary embodiment of the improved plant soil protector which is especially adapted for square pots. As can be seen from the drawing, the improved plant soil protector is made up of a plurality of trapezoidal-like segments 21 which, when joined together, cover the soil area of a square pot 20, leaving therein a square opening 23 for a potted plant.

Figure 5:
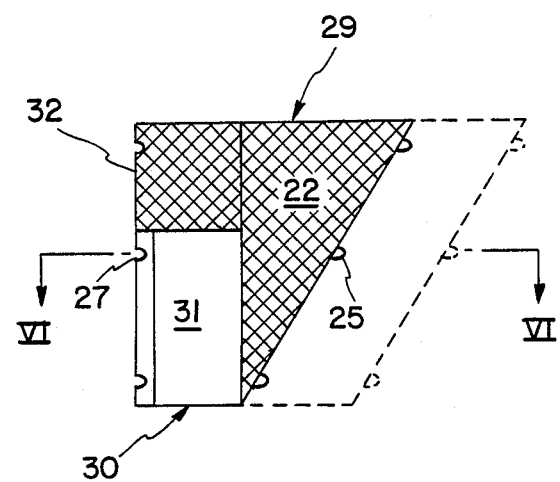
FIG. 5 shows a top view of a segment of the plant soil protector depicted in FIG. 4.

FIG. 5 shows the individual segment 21 pictured in FIG. 4 and illustrates the means in which the segment 21 may be adapted for different sized pots. As can be seen from the drawing, the segment 21 is made up of two (2) individual segments, a first segment 29 and a second segment 32. With further reference to the sectional view shown in FIG. 6, the segment 29 includes a stem 31 that slideably engages a slot 33 in the segment 32. The segment 29 also includes a plurality of protrusions 25 on one end, the protrusions 25 being adapted to fit into to a corresponding recess on an adjacent trapezoidal shaped segment (not shown). The segment 32 includes a plurality of recesses 27 which are adapted to receive a corresponding protrusion on an adjacent trapezoidal shaped piece (not shown). The protrusions 25 and the recesses 27 permit the segments 21 to be joined together to completely cover the soil surface area of the potted plant. It should be noted that both the sections 29 and 32 be made of a grid-like material to permit the passage of air, water and fertilizer therethrough and prevent contact of the soil by a pet.

Figure 6:
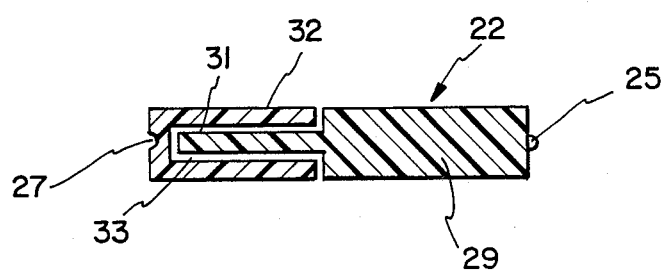
FIG. 6 shows a cross-sectional view along the line VI—VI of FIG. 5.

The embodiment as depicted in FIGS. 4-6 may also be adapted for the circular segment as shown in FIGS. 1-3. In this respect, the circular segment 1 may include a segment that is designed to slideably engage a slot in the side of the circular segment 1 to permit the segments 1 to be used for different diameter pots. Likewise, the trapezoidal shaped segment 21 may include the extender slideably engaging a slot on the end portion thereof, similar to that depicted in FIGS. 1-3, such that the trapezoidal shaped segments may be adapted for different sized plants.

The material for the grid-like structure of the segments may be any material. A preferred material would include plastic to permit ease of manufacture.

The improved plant soil protector of the present invention provides advantages over those known in the prior art in that the segments which make up the improved plant soil protector may be adapted to different sized pots as well as different sized plants. With this feature, a single set of segments may be utilized for a wide variety of pots and/or plants.

As such, an invention has been disclosed in terms of a preferred embodiment thereof which fulfills each and every one of the objects of the present invention as set forth hereinabove and provides a new and improved plant soil protector of great utility and novelty.

Of course, many changes, modifications and alterations in the teachings of the present invention may be contemplated by those skilled in the art without departing from the intended spirit and scope thereof. As such, it is intended that the present invention only be limited by the terms of the appended claims.

What is claimed:

1. An improved plant soil protector for protecting a plant contained within a soil filled pot having a peripheral rim, comprising:
   (a) a plurality of segments, each said segment made of a grid material to permit passage of air and water therethrough, each segment further including:
      (i) means to removably attach a segment to an adjacent segment such that said segments when attached together substantially cover said soil, said segments, when attached together, combining to form a central opening adapted to surround said plant when said protector is placed in overlying relation to said soil;
      (ii) means to enlarge each respective said segment such that each said segment may cover a larger area of soil, said plurality of segments thereby being adapted to protect differing sized potted plants and soil therearound; and
      (iii) each said segment having attachment means for removably attaching said segments on said pot.

2. The invention of claim 1, wherein said grid material is plastic.

3. The invention of claim 1, wherein said means to enlarge each respective said segment further comprises:
   (a) a slot in a portion of a said segment; and
   (b) an extender slideably engageable in said slot, said extender being adapted to be withdrawn from said slot and cover additional soil.

4. The invention of claim 3, wherein said extender is made of a grid material.

5. The invention of claim 1, wherein said means to enlarge each respective said segment further includes a said segment further comprising:
   (a) a first portion having a slot therein; and
   (b) a second portion having a stem thereon, said stem being adapted to slideably engage said slot of said first portion, said stem of said portion being adapted to be withdrawn from said slot such that said stem and said second portion cover additional soil.

6. The invention of claim 5, wherein said first portion, said second portion and said stem are made of a grid material.

7. The invention of claim 1, wherein said attachment means comprises a clip on each segment.

8. The invention of claim 7, wherein each said clip is adapted to be attached over said rim of said pot.

9. The invention of claim 1, wherein said central opening is larger than openings defined through said grid material.

* * * * *